(12) United States Patent
Capello et al.

(10) Patent No.: US 8,955,297 B2
(45) Date of Patent: Feb. 17, 2015

(54) SNAPPING UNIT FOR HEADS OF HARVESTING MACHINES

(75) Inventors: Andrea Capello, Cuneo (IT); Renato Capello, Busca (IT); Milena Maria Villar, legal representative, Busca (IT)

(73) Assignee: Capello S.R.L., Cuneo (IT)

( * ) Notice: Subject to any disclaimer, the term of this patent is extended or adjusted under 35 U.S.C. 154(b) by 49 days.

(21) Appl. No.: 13/817,480

(22) PCT Filed: Aug. 3, 2011

(86) PCT No.: PCT/IB2011/053452
§ 371 (c)(1),
(2), (4) Date: Jul. 24, 2013

(87) PCT Pub. No.: WO2012/023083
PCT Pub. Date: Feb. 23, 2012

(65) Prior Publication Data
US 2013/0340402 A1 Dec. 26, 2013

(30) Foreign Application Priority Data
Aug. 19, 2010 (IT) .............................. TO2010A0705

(51) Int. Cl.
*A01D 45/02* (2006.01)
(52) U.S. Cl.
CPC .................................... *A01D 45/025* (2013.01)
USPC ......................................................... 56/104
(58) Field of Classification Search
USPC .................... 56/104, 113; 460/26, 29–33, 35
See application file for complete search history.

(56) References Cited

U.S. PATENT DOCUMENTS

| | | | | |
|---|---|---|---|---|
| 864,227 A | * | 8/1907 | Brass | 56/109 |
| 914,465 A | * | 3/1909 | Stone | 460/32 |
| 1,641,436 A | * | 9/1927 | Jett | 460/29 |
| 1,641,682 A | | 9/1927 | Kruse | |
| 1,736,347 A | * | 11/1929 | Keeler | 460/32 |
| 1,764,686 A | * | 6/1930 | Kuhlman | 460/27 |
| 2,169,070 A | * | 8/1939 | Kuhlman | 460/27 |
| 2,178,013 A | * | 10/1939 | Blank | 460/27 |

(Continued)

FOREIGN PATENT DOCUMENTS

EP 1 502 492 A2 2/2005

OTHER PUBLICATIONS

International Search Report and Written Opinion for PCT Application No. PCT/IB2011/053452 mailed Dec. 1, 2011.

*Primary Examiner* — Thomas B Will
*Assistant Examiner* — Mai Nguyen
(74) *Attorney, Agent, or Firm* — RatnerPrestia

(57) ABSTRACT

Snapping unit for heads of harvesting machines, including a pair of counter-rotating snapping rolls and a support and motion transmitting unit with which the snapping rolls are associated so as to cooperate with each other when placed into rotation around their longitudinal axis, each snapping roll including a body where a cylindrical rear portion and a frustoconical front portion are defined, the side wall of the body being provided on its outer surface with longitudinal helical grooves defining helical protrusions ending in corresponding helical ridges capable of penetrating the groove defined between the helical ridges of the adjacent roll during rotation of the two snapping rolls, wherein the helical grooves and, correspondingly, the helical protrusions and the respective helical ridges have a pitch at least equal to the total length of the corresponding roll and extend on at least part of the frustoconical portion.

17 Claims, 5 Drawing Sheets

(56) References Cited

U.S. PATENT DOCUMENTS

| | | | |
|---|---|---|---|
| 2,440,791 A | 5/1948 | Welty | |
| 2,587,857 A * | 3/1952 | Karlsson | 460/31 |
| 2,905,181 A * | 9/1959 | Nelson | 460/27 |
| 3,462,928 A * | 8/1969 | Schreiner et al. | 56/104 |
| 6,050,071 A * | 4/2000 | Bich et al. | 56/52 |
| 7,237,373 B2 | 7/2007 | Resing et al. | |
| 7,930,870 B2 * | 4/2011 | Rottinghaus | 56/104 |
| 2012/0047865 A1 * | 3/2012 | Lohrentz et al. | 56/113 |

* cited by examiner

SNAPPING UNIT FOR HEADS OF HARVESTING MACHINES

This application is the U.S. National Phase Application of PCT/IB2011/053452, filed Aug. 3, 2011, which claims priority to Italian Application No. TO2010A000705, filed Aug. 19, 2010, the contents of such applications being incorporated by reference herein.

TECHNICAL FIELD

The present invention concerns a snapping unit for heads of harvesting machines, in particular self-propelling harvesting machines for cereals and more particularly for maize.

PRIOR ART

Harvesting machines for cereals are equipped with a head, generally replaceable and arranged in the front part of the machine, which includes a set of snapping units.

The snapping units are to pull the stalks of the cereals downwards, until causing the detachment of the cobs while the machine is moving forward.

Each snapping unit substantially comprises a pair of counter-rotating snapping rolls and a support and motion transmitting unit, generally equipped with a motor-reducer, to place the snapping rolls into rotation.

Depending on the applications, the snapping rolls may be supported by the support and motion transmitting unit at both ends, i.e. at the front and rear ends, or they may be cantilevered, i.e. supported at the rear end only.

The snapping rolls comprise a substantially cylindrical body with a tapered, generally frustoconical front end portion, defining a draft region for making the entry of the stalks between the counter-rotating rolls easier.

The side surface of each roll is provided with protruding portions, which give rise to the downward-pulling effect on the stalks by cooperating with the protruding portions of the adjacent roll in the same snapping unit.

EP 1502492 and U.S. Pat. No. 7,237,373 disclose examples of snapping units equipped with helical side protrusions and with protrusions shaped as longitudinal radial knives, respectively.

Moreover, snapping units are known where the rolls rotate in synchronised manner so that the ridges of their radial protrusions or their knives are in phase and approach each other without contacting until their spacing becomes approximately a few millimeters.

Other known snapping units comprise snapping rolls where the protrusions of one roll are out-of-phase with respect to the protrusions of the other roll, whereas they are in phase with the bights defined in the gaps between the ridges of the other roll. Also in this case the minimum distance between the ridges of one roll and the surfaces of the bights of the other roll is a few millimeters.

Moreover, the radial protrusions and the knives may be rectilinear and extend substantially along a generatrix of the cylindrical body, or they may be elliptical, continuous or interrupted, integrally formed in the roll body or removable in order to allow their replacement.

In the past, different kinds of snapping rolls have been developed, in order to improve the performance of the harvesting machine.

The wear of the longitudinal radial protrusions and the knives in the snapping rolls is generally high and often it is worsened due to the fact that the stalks are covered with powder of abrasive minerals deposited on the plant by the retreat of irrigation water.

One of the problems associated with the design of a snapping unit for heads of harvesting machines is thus how to reduce the wear of the rolls, in particular of the radial protrusions or the knives.

Snapping rolls equipped with removable protrusions or knives do not solve the aforementioned problem, in that the replacement of the protrusions or the knives is a laborious operation, which is time consuming and entails stopping the machine. Moreover, snapping rolls of this kind allow replacing only protrusions or knives arranged along the cylindrical body, whereas they do not allow replacing the protrusions provided on the frustoconical front portion of the rolls.

Thus, it is one object of the present invention to provide a snapping unit for harvesting machine that has a longer duration.

Usually, performance of a snapping unit is better when the stalks met by the snapping rolls vertically extend from ground. This situation generally occurs as long as the push exerted against the stalks met by the unit is opposed by the subsequent stalks in the row. While the machine is proceeding and approaching the end of the stalk row, this opposing force decreases and it is wholly lacking for the last stalks. Consequently, the snapping unit meets the last stalks while they are considerably inclined forward due to the push exerted by the machine. A drawback of the prior art units is the low performance when the stalks are not perfectly vertical. This drawback results in an economical loss due to the missed or incorrect harvesting of the last stalks in each row.

It is another object of the invention to solve the aforementioned problem by providing a snapping unit whose performance is independent of the inclination of the stalks, and hence of the absence of further stalks along the row.

It is a further, but not the last, object of the invention to provide a snapping unit of the above kind that has high performance and can be industrially manufactured with limited costs.

The above and other objects are achieved by the snapping unit according to the invention, as claimed in the appended claims.

DESCRIPTION OF THE INVENTION

According to a first aspect of the invention, the helical protrusions on the snapping rolls have a considerable pitch, at least equal to the total length of the rolls, and thus they have a longer extension and are less aggressive than the existing protrusions, generally provided only on the frustoconical portion. Advantageously, thanks to such a feature, the snapping action is uniformly distributed over the whole roll body, starting from the frustoconical front portion, and in this manner a reduced wear of the roll protrusions is obtained.

According to a second aspect of the invention, the grooves and the corresponding helical protrusions longitudinally extend on the cylindrical portion and on at least part of the frustoconical portion, with the same and substantially constant pitch along the total length of the helical grooves, with the advantage that the roll manufacture is made less onerous.

According to a third aspect of the invention, the helical protrusions longitudinally extend on the cylindrical portion in uniform manner, whereas on the frustoconical portion the even-number protrusions are less accentuated than the odd-number ones for advantageously preventing the phenomenon of the packing of the vegetable material.

Moreover, the curvilinear concave cross section of the grooves, which according to a preferred embodiment of the invention longitudinally extend, without interruptions, along the lateral surface of the roll, contributes to reducing the wear of the ridges of the protrusions.

A further advantage of the invention results from the possibility of obtaining a snapping unit with helices that are either divergent or convergent towards the front portion, simply by inverting the snapping rolls.

BRIEF DESCRIPTION OF THE DRAWINGS

Some preferred embodiments of the invention will be given by way of non-limiting example with reference to the accompanying drawings, in which.

DESCRIPTION OF A PREFERRED EMBODIMENT

Figure 1:
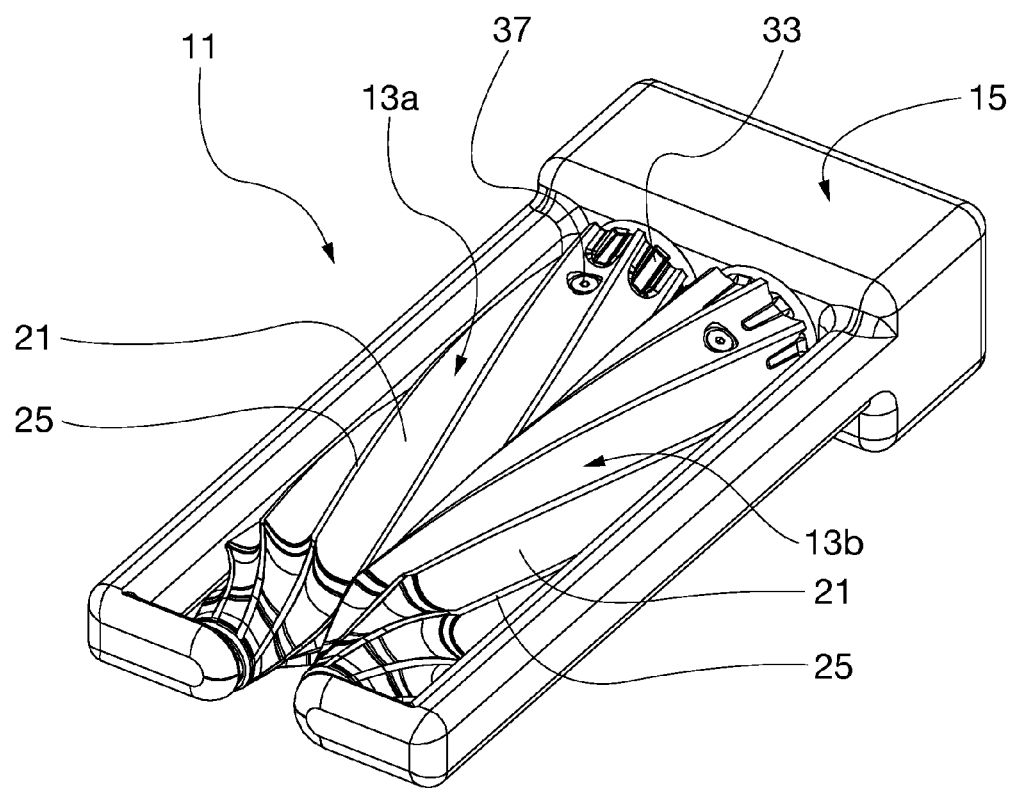
FIG. 1 is a top perspective view of a first embodiment of the snapping unit according to the invention.
Figure 2:
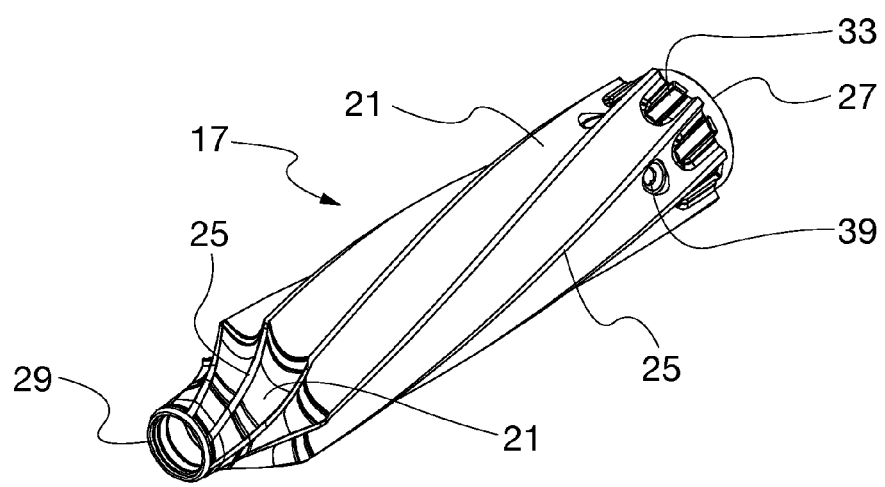
FIG. 2 is a perspective view of a snapping roll according to the invention.
Figure 4:
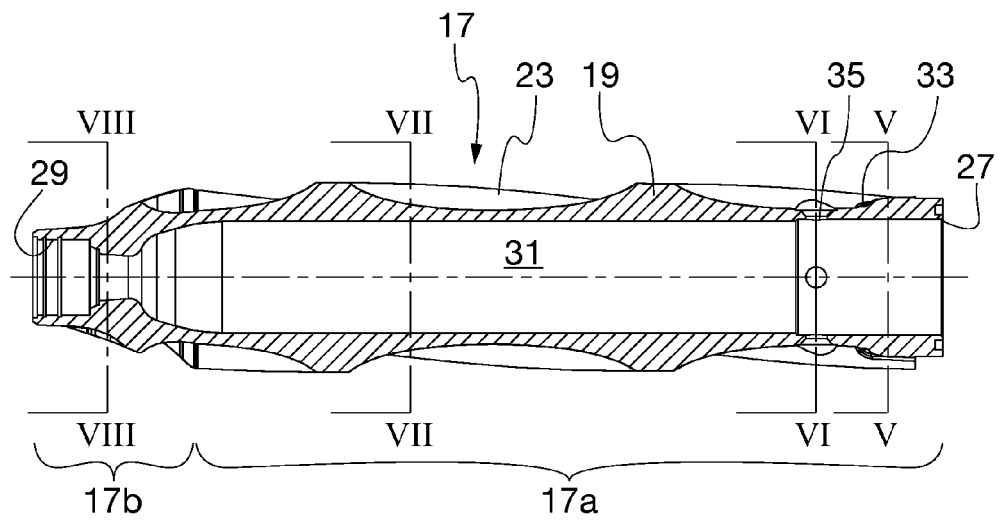
FIG. 4 is a cross-sectional view taken along line IV-IV of FIG. 3.
Figure 3:
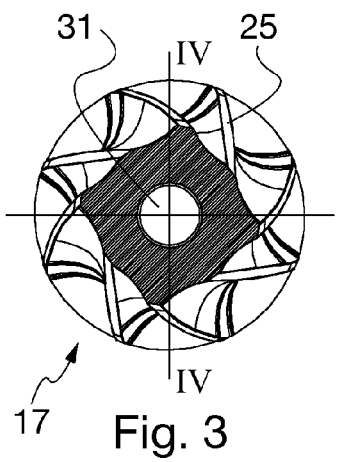
FIG. 3 is a front view of the roll shown in FIG. 2.
Figure 5:
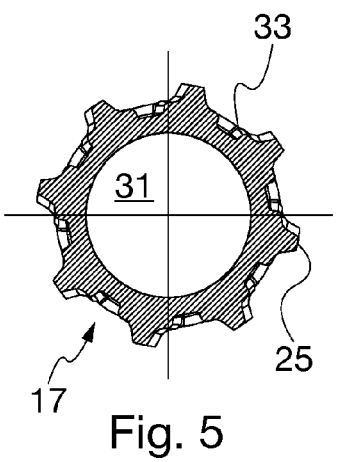
FIGS. 5, 6, 7 and 8 are corresponding cross-sectional views taken along lines V-V, VI-VI, VII-VII and VIII-VIII of FIG. 4.
Figure 6:
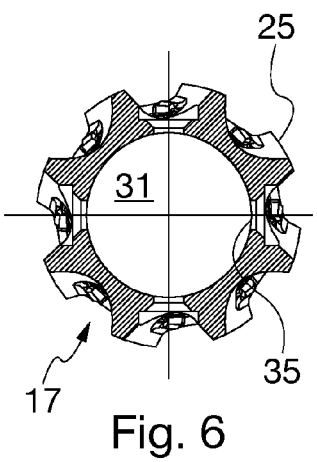
Figure 7:
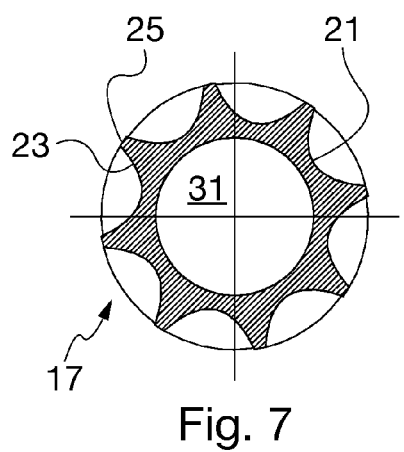
Figure 8:
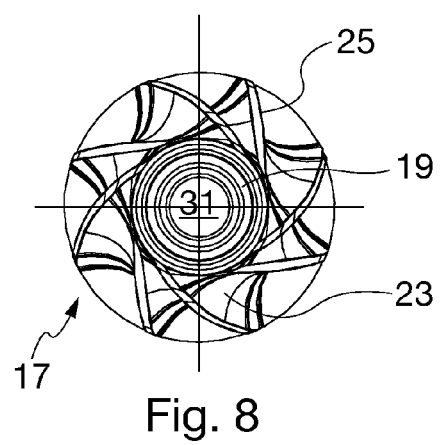

Referring to FIGS. 1 to 8, there is shown a snapping unit 11 for heads of harvesting machines according to a first embodiment of the invention.

Unit 11 comprises a pair of snapping rolls 13a, 13b and a support and motion transmitting unit 15.

The snapping rolls are associated with unit 15 so as to mutually cooperate when they are made to rotate in opposite directions about their longitudinal axis.

Each snapping roll 13a, 13b comprises a body 17 where a cylindrical rear portion 17a and a frustoconical front portion 17b are defined. According to the invention, body 17 is preferably a monolithic hollow body.

Side wall 19 of body 17 is provided on its outer surface with longitudinal helical grooves 21 defining helical protrusions 23 ending in corresponding helical ridges 25. Said grooves 21 preferably have a curvilinear concave cross section. Thus, wall 19 of body 17 will have a sufficient thickness to define grooves 21 with suitable depth.

Ridges 25 longitudinally extend, preferably without interruptions, along the lateral surface of said body 17, between rear end 27 and front end 29 of body 17.

Snapping rolls 13a, 13b are associated with unit 15 so that their rotation axes are substantially mutually parallel and so that, during counter-rotation of the two snapping rolls, helical ridges 25 of one roll penetrate grooves 21 defined between helical ridges 25 of the adjacent roll.

For this reason, helical grooves 21 will be right-handed grooves in one roll and left-handed grooves in the other roll of the roll pair in a same snapping unit 11.

In the example illustrated, eight grooves 21, defining eight corresponding ridges 25, are provided.

However, according to the invention, a different number of grooves 21 and corresponding ridges 25, for instance six or ten, can be provided.

Referring in particular to FIGS. 2 to 8, a snapping roll incorporated within the snapping unit according to the invention is shown in detail. Said Figures show in particular the roll denoted 13a in FIG. 1. Roll 13b only differs from roll 11 in the opposite screwing direction of grooves 21 and the corresponding protrusions 23, and for that reason illustrating it in detail has been deemed superfluous.

Body 17 has an internal cavity 31 axially extending throughout the whole body between ends 27 and 29. In the illustrated embodiment, both ends 27 and 29 further have corresponding axial openings.

According to the invention, helical grooves 21 and, correspondingly, helical protrusions 23 and the respective helical ridges 25 have a considerable pitch, at least equal to the total length of the corresponding roll. According to this arrangement, therefore, two consecutive intersections between one helical ridge 25 and any of the generating lines of the cylindrical portion 17a of body 17, both indefinitely prolonged, are separated by a distance approximately at least equal to the total length of body 17 of the snapping roll.

In the illustrated example, the pitch is about twice the total length of the body of the snapping roll. For instance, if rolls 13a, 13b have a total length (i.e. including both the cylindrical and the frustoconical portions) of 500 mm, the pitch of the helices will be about 1000 mm.

Moreover, grooves 21, the corresponding helical protrusions 23 and ridges 25 longitudinally extend on the cylindrical portion and on at least part of the frustoconical portion, with the same pitch that is substantially constant along the total length of grooves 21.

Small grooves 33 having a substantially "U" shaped cross section are provided at the 25 base of the snapping roll close to its rear end 27 and inside grooves 21. Said grooves 33 are arranged in the middle of at least some grooves 21, and preferably of all said grooves 21, so that ridges 25 of the adjacent snapping roll enter between the legs of the "U" of groove 33 during rotation of the two snapping rolls in opposite directions. More precisely, according to a preferred embodiment of the invention, each groove 33 reproduces, on a reduced scale, 30 the cross-section of groove 21 defined between helical protrusions 23. The cooperation between ridges 25 of helical protrusions 23 and the walls of grooves 33 is a decisive factor for cutting the weeds which could block the snapping unit and consequently the harvesting machine, due to the intervention of the torque limiter with which the transmission units of the latter are generally equipped. According to the invention, said grooves 33 are preferably integral with body 17 of the snapping roll, i.e. they are obtained by casting or machining of the material of which the same body of the roll is made, and thus they cannot be removed from said body.

According to the invention, helical protrusions 23 have a uniform radial height along cylindrical rear portion 17a, i.e. the depth of grooves 21 is substantially constant along the cylindrical rear portion of body 17. On the contrary, according to a preferred embodiment of the invention, even-number protrusions 23 end on the frustoconical portion 17b at a different distance from front end 29 with respect to the odd-number protrusions 23. For instance, the even-number protrusions extend up to front end 29, whereas the odd-number protrusions stop in advance, i.e. they end before reaching front end 29. In a preferred embodiment of the invention, even-number protrusions 23 substantially extend along the whole frustoconical front portion 17b, whereas the odd-number protrusions extend along about no more than half said portion 17b. That alternation advantageously allows preventing the phenomenon of the packing of the vegetable material arriving at the inlet of snapping unit 11, which phenomenon could occur because of the reduced width of grooves 21

Moreover, body 17 of the snapping rolls has radial through-holes 35 for the passage of fastening means, e.g. screws 37, whose function will become apparent from the following description. Said holes 35 further have a flared inlet 39 in order to receive the head of screw 37, so that the latter does not protrude from the roll surface.

Figure 9:
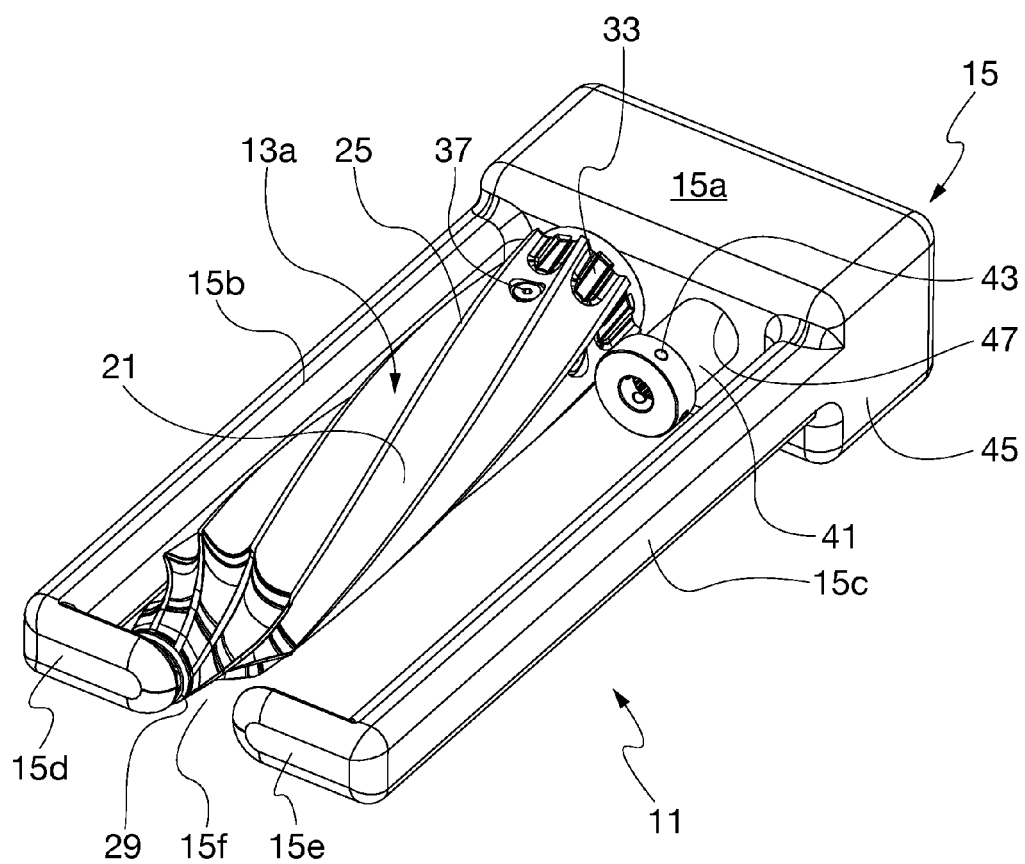
FIG. 9 is a view similar to FIG. 1 with one roll removed.

Referring to FIG. 9, in this first embodiment, unit 11 comprises a unit 15 supporting the rolls at both their front and rear ends. More particularly, unit 15 has a base 15a and a pair of parallel arms 15b, 15c that protrude from base 15a, extend parallel to the snapping rolls and end with a corresponding inward-directed protrusion 15d, 15e. Protrusions 15d, 15e are directed towards each other and are separated by an inlet mouth 15f for the passage of the stalks entering the snapping unit. In the whole, base 15a, arms 15b, 15c and protrusions 15d, 15e thus define a corresponding coplanar frame surrounding the snapping rolls and having an interruption at inlet mouth 15f.

Base 15 houses the mechanical members transmitting the rotary motion to the snapping rolls, such members generally comprising a gear reducer. Hubs 41 associated with said motion transmitting mechanical members extend from base 15a into cavity 31 of the rolls. The rolls are thus rotatably supported by said hubs 41, to which they are firmly fastened through fastening means 37. To this end, hubs 41 have seats 3743, which are threaded if means 37 are screws, through which fastening means 37 pass. An idle support (not shown) associated with protrusions 15d, 15e and received in the open front end 29 of the roll is provided in front of the snapping rolls.

In a preferred embodiment of the invention, base 15 has a casing 45 with openings 47 through which hubs 41 pass.

Figure 10:
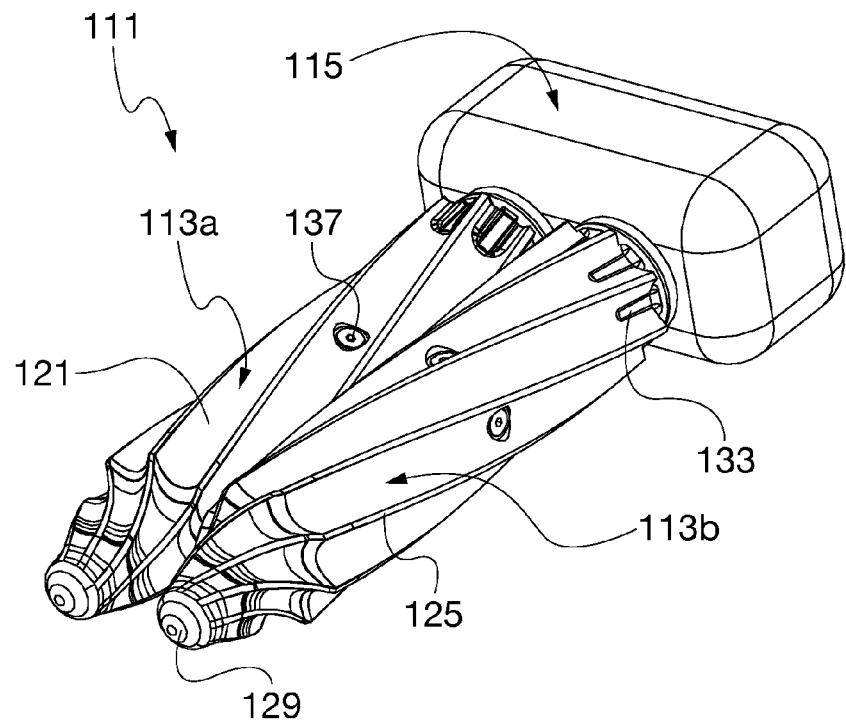
FIG. 10 is a top perspective view of a second embodiment of the snapping unit according to the invention.
Figure 11:
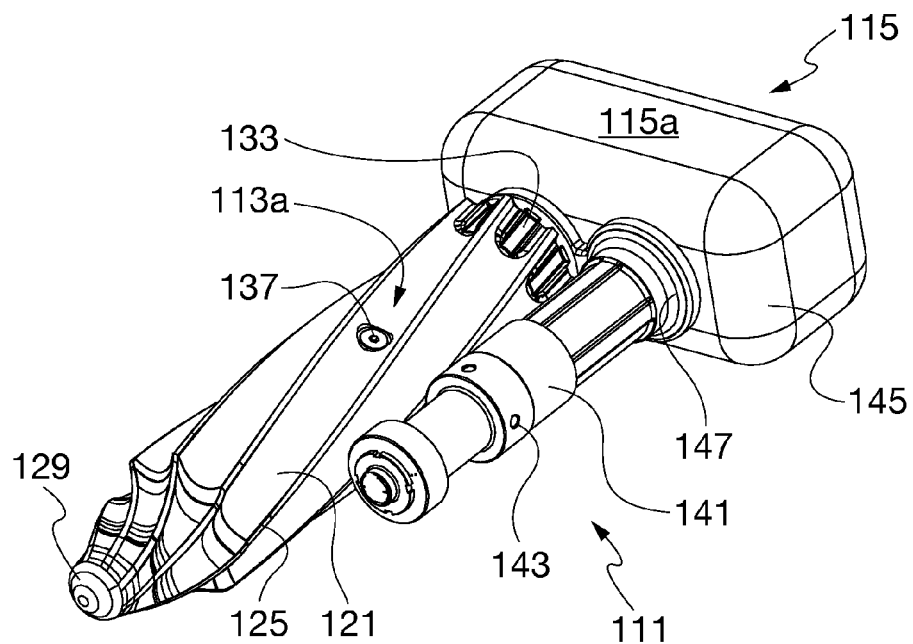
FIG. 11 is a view similar to FIG. 10 with one roll removed.

Referring to FIGS. 10 and 11, there is shown a second embodiment of a snapping unit according to the invention. In those Figures, elements corresponding to those previously disclosed are denoted by corresponding reference numerals, preceded by digit 1. This second embodiment differs from the first one substantially only in that snapping rolls 113a, 113b are cantilevered on support and motion transmitting unit 115. Said unit 115 substantially comprises a base 115a from which protrude hubs 141, to which the snapping rolls are secured in similar manner to what described with reference to the first embodiment. Yet, in this second embodiment, hubs 141 have a greater length and substantially extend over about half the length of the rear portion of the snapping rolls. Similarly, holes 135 for the passage of fastening means 137 are located at about half length of the cylindrical portion of the rolls. This arrangement is necessary in order to make up for the absence of the front support for the snapping rolls and to prevent flexions of the rolls with respect to the hubs.

According to this embodiment of the invention, front end 129 of the snapping rolls is closed to prevent material from entering internal cavity 131 housing hub 141.

Figure 12:
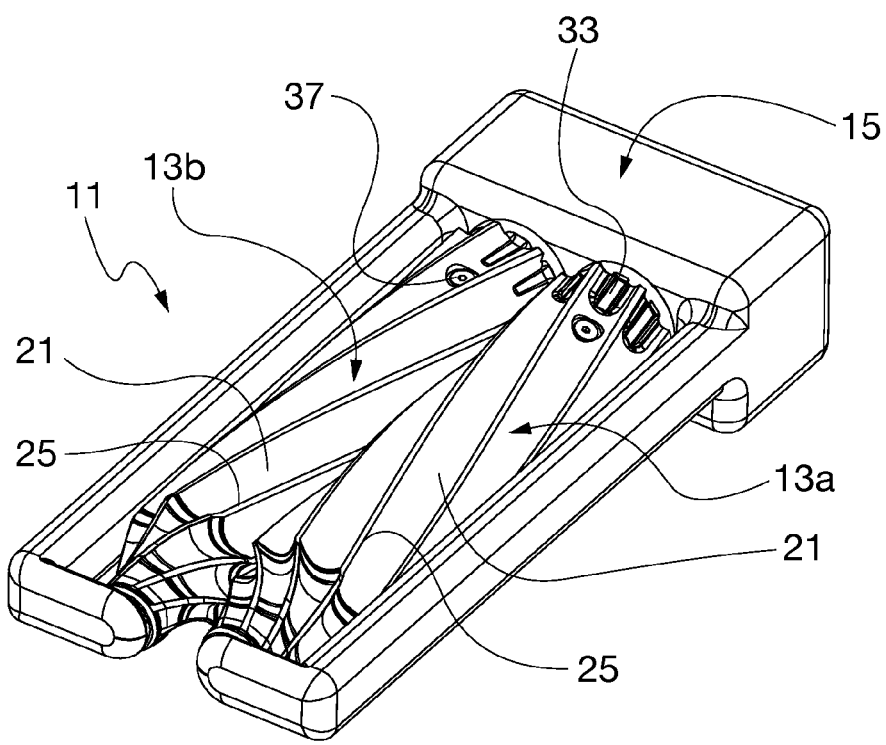
FIGS. 12 and 13 show a unit similar to the unit shown in FIGS. 1 and 10, respectively, in which the rolls are arranged mutually exchanged.
Figure 13:
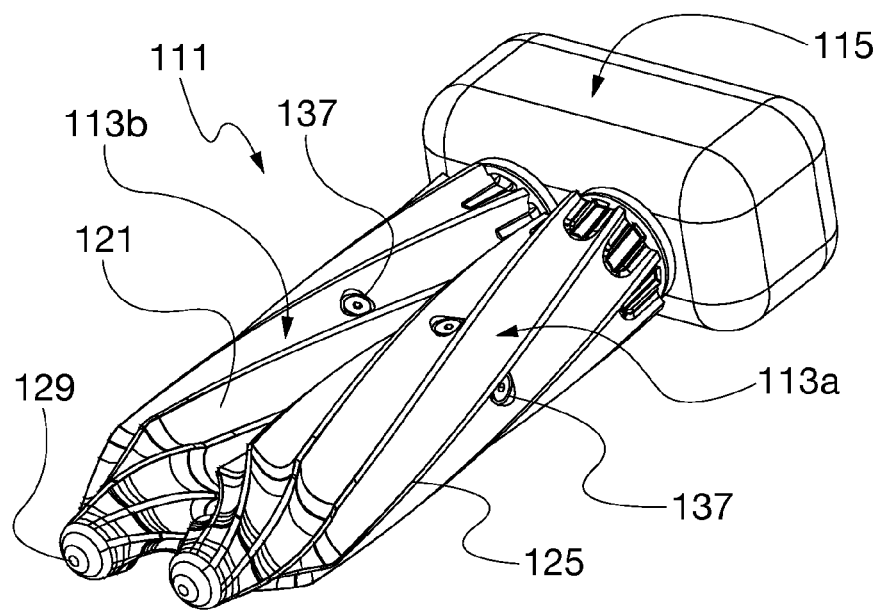

Referring now to FIGS. 12 and 13, there are shown two snapping units similar to those disclosed with reference to FIGS. 1 and 10, respectively, in which however snapping rolls 13a, 13b and 113a, 113b are mutually exchanged, i.e. the left-hand roll has been located at the right and the right-hand roll has been located at the left in the snapping unit.

According to this arrangement, the roll helices are divergent from the rear end to the front end of the snapping unit.

Advantageously, the performance of the machine according to the invention, depending on the conditions of the cereals to be reaped, can thus be varied simply by inverting the snapping rolls.

In any embodiment of the invention, the snapping rolls are preferably made by casting austempered cast iron, which is lighter and cheaper than the steel normally used for the prior art rolls.

The invention claimed is:

1. A snapping unit for heads of harvesting machines, comprising a pair of counter-rotating snapping rolls and a support and motion transmitting unit with which the snapping rolls are associated so as to cooperate with each other when placed into rotation around their longitudinal axis, each snapping roll comprising a body wherein a cylindrical rear portion and a frustoconical front portion are defined, a side wall of the body being provided on its outer surface with longitudinal helical grooves defining helical protrusions ending in corresponding helical ridges capable of penetrating the helical groove defined between the helical ridges of the adjacent roll during rotation of the two snapping rolls, wherein the helical grooves and correspondingly the helical protrusions and the respective helical ridges have a pitch at least equal to a total length of the corresponding roll and extend on at least part of the frustoconical portion,
wherein small grooves having a substantially "U" shaped cross section are provided at the base of the snapping roll close to its rear end and inside the longitudinal helical grooves, said small grooves being arranged substantially in the middle of at least some of the longitudinal helical grooves so that the ridges of the adjacent snapping roll enter between the legs of the "U" shaped small grooves during rotation of the two snapping rolls.

2. The snapping unit according to claim 1, wherein said pitch is substantially constant along the total length of the helical grooves.

3. The snapping unit according to claim 1, wherein said pitch is about twice the total length of the snapping roll.

4. The snapping unit according to claim 1, wherein two consecutive intersections between one helical ridge and any of the generating lines of the cylindrical portion of the body, both indefinitely prolonged, are separated by a distance at least equal to the total length of the body of the snapping roll.

5. The snapping unit according to claim 1, wherein said helical grooves have a curvilinear concave cross section and extend longitudinally, without interruptions, along the lateral surface of said body.

6. The snapping unit according to claim 1, wherein from six to ten helical grooves are provided and said helical grooves define from six to ten corresponding protrusions provided with respective ridges.

7. The snapping unit according to claim 6, wherein eight helical grooves are provided and said helical grooves define as many protrusions provided with respective ridges.

8. The snapping unit according to claim 1, wherein each small groove reproduces, on a reduced scale, the cross-sectional shape of the helical groove defined between the helical protrusions.

9. The snapping unit according to claim 1, wherein said body is a monolithic hollow body and said small grooves are integral with the body of the snapping roll, i.e. they are obtained by casting or machining of the material of which the roll itself is made.

10. The snapping unit according to claim 1, wherein said support and motion transmitting unit supports the snapping rolls both at the rear end and at the front end or only at the rear end in a cantilevered manner.

11. The snapping unit according to claim 1, wherein the helical grooves are right-handed grooves in one roll and left-handed grooves in the other roll of the roll pair in a same snapping unit.

12. The snapping unit according to claim 1, wherein the body has an internal cavity axially extending over the whole body between the ends of the body and wherein both ends are axially open.

13. The snapping unit according to claim 1, wherein the helical grooves, the corresponding helical protrusions and the ridges longitudinally extend on the cylindrical portion and on at least part of the frustoconical portion, with the same pitch that is substantially constant along the total length of the helical grooves.

14. The snapping unit according to claim 1, wherein the helical protrusions have a uniform radial height along the cylindrical rear portion, such that the depth of the helical grooves is substantially constant along the cylindrical rear portion of the body.

15. The snapping unit according to claim 1, wherein the support unit supports the rolls at both their front and rear ends and has a base and a pair of parallel arms protruding from the base, extending parallel to the snapping rolls and ending with a corresponding inwards-directed protrusion, the protrusions being directed towards each other and being separated by an inlet mouth for the passage of the stalks entering the snapping unit.

16. The snapping unit according to claim 1, wherein the helical protrusions of the roll pair are divergent, or convergent from the rear end to the front end of the rolls.

17. A harvesting machine, comprising a head equipped with at least one snapping unit as claimed in claim 1.

* * * * *